United States Patent [19]

Morgan et al.

[11] Patent Number: 5,482,901
[45] Date of Patent: Jan. 9, 1996

[54] AMBER PHOTOCHROMIC GLASSES

[75] Inventors: David W. Morgan; Brent M. Wedding, both of Corning, N.Y.

[73] Assignee: Corning Incorporated, Corning, N.Y.

[21] Appl. No.: 275,773

[22] Filed: Jul. 15, 1994

[51] Int. Cl.⁶ ........................................ C03C 4/06
[52] U.S. Cl. ........................ 501/13; 501/67; 501/43
[58] Field of Search .................... 501/13, 67, 43

[56] References Cited

U.S. PATENT DOCUMENTS

| 3,892,582 | 7/1975 | Simms . | |
|---|---|---|---|
| 3,920,463 | 11/1975 | Simms . | |
| 4,190,451 | 2/1980 | Hares et al. . | |
| 4,240,836 | 12/1980 | Borrelli et al. . | |
| 4,251,278 | 2/1981 | Hares . | |
| 4,290,794 | 9/1981 | Wedding . | |
| 4,608,349 | 8/1986 | Kerko et al. . | |
| 4,832,724 | 5/1989 | Borrelli et al. . | |
| 4,840,655 | 6/1989 | Borrelli et al. . | |
| 4,878,748 | 11/1989 | Johansen et al. . | |
| 5,244,845 | 9/1993 | Kerko et al. . | |
| 5,256,601 | 10/1993 | Kerko et al. | 501/13 |
| 5,300,465 | 4/1994 | Grateau et al. | 501/13 |

*Primary Examiner*—Karl Group
*Attorney, Agent, or Firm*—Milton M. Peterson

[57] ABSTRACT

A surface-reduced photochromic glass containing silver halide crystals, having an original transmittance of 60–75%, a darkened transmittance of less than 30% at 25° C., a faded transmittance equal to the darkened transmittance plus at least 25% and a value of at least 50%, a position in a color mixture diagram between 575 and 585 nm, the glass composition having a $Na_2O$ content of at least 1% in its surface, or containing as additives 1–6 ppm Pd, or a combination of 2–10 ppm Au and up to 0.9% $Er_2O_3$. The glass may be chemically strengthened and generally has a longer dominant wavelength when so treated.

10 Claims, 1 Drawing Sheet

AMBER PHOTOCHROMIC GLASSES

FIELD OF THE INVENTION

Photochromic, borosilicate glasses useful in ophthalmic lenses and having an amber fixed tint.

BACKGROUND OF THE INVENTION

Commercially important photochromic glasses have been derived from a glass family described in U.S. Pat. No. 3,208,860 (Armistead et al.). These glasses are characterized by having a precipitated microcrystalline silver halide phase.

U.S. Pat. Nos. 3,892,582 and 3,920,463 (Simms) describe a thermal reduction treatment for silver halide photochromic glasses that may be augmented by ultraviolet irradiation. The treatment is described as producing various fixed tints, primarily yellow, in the photochromic glasses.

The Simms patents disclose, by way of specific example, a glass having the following composition in approximate percent by weight:

| | | | |
|---|---|---|---|
| $SiO_2$ | 55.9 | $ZrO_2$ | 2.3 |
| $Al_2O_3$ | 9.0 | Ag | 0.16 |
| $B_2O_3$ | 16.2 | Cl | 0.29 |
| $Li_2O$ | 2.65 | Br | 0.72 |
| $Na_2O$ | 1.85 | CuO | 0.036 |
| PbO | 5.05 | F | 0.2 |
| BaO | 6.7 | | |

It is stated that a permanent yellowish tint was imparted by firing this glass in a 5% $H_2$ –95% $N_2$ atmosphere for 8 minutes at a temperature of 450° C.

A line of amber ophthalmic lenses was developed on the basis of the patent teachings. They faded slowly from the darkened state.

U.S. Pat. No. 4,190,451 (Hares et al.) describes a development of silver halide, photochromic glasses having improved darkening and fading rates. These glasses are also described as being susceptible to strengthening by either thermal or chemical tempering to enable lenses to pass the ball drop test prescribed by the FDA.

The latter procedure involves treatment in a molten salt bath to exchange sodium or potassium ions from the salt bath for lithium or sodium ions, respectively, from the glass. One such treatment involves exposure in a mixed salt bath for 16 hours at about 400° C.

U.S. Pat. No. 4,240,836 (Borrelli et al.) describes a thermal reduction treatment which, when applied to the Hares et al. glasses, provides a variety of colors beyond the then known yellow. These colors are characterized by having absorption peaks in their transmittance curves to the right of a line extending from about 460 nm. at 0 transmittance to about 510 nm. at 100% transmittance. These peaks contrast with absorption peaks in prior glasses which generally occurred to the left of this line. The colors are produced by a reducing treatment at a temperature not over 450° C. The treated glasses have improved photochromic properties and an attractive color in the darkened state.

Each of the previously available glasses provide certain features desired in a photochromic amber sunglass. However, no one of them manages to combine all of these in one glass.

Marketing research indicated that the color target for an amber photochromic sunglass lens in the faded state was one having a dominant wavelength near 577 nm, spectral purity between 35 and 40% and luminous transmittance of about 74%. Attempts to achieve that color target by hydrogen-firing the faster fading –451 glass (Code 8111) were not successful. Either the transmittance was too high at the desired chromaticity coordinates, or the spectral purity was too large at the desired transmittance. In either case, the lens appeared to be more yellow than amber.

An additional drawback for marketing acceptance was that the lens looked greenish in the darkened state. Hydrogen-firing a photochromic glass having a modified composition (Code 8122) yielded a more acceptable brownish color in the darkened state. However, that glass did not get dark enough in hot weather for use as a sunglass. Also a desired faded color was not achieved.

A pleasing, though somewhat dark, faded color could be made using a reduced photochromic glass which also employed a fixed tint colorant. That glass had acceptable darkened color, but did not fade as rapidly as was desired.

There has remained a need for a photochromic sunglass that combines good photochromic properties with an amber fixed tint having a more acceptable appearance in both the faded and darkened states. In particular, the faded glass should be a true amber, rather than a bright yellow. Also, the darkened glass should have a reddish brown tint, rather than a greenish cast.

SUMMARY OF THE INVENTION

Our invention resides in a photochromic glass that has a pleasing amber color in the darkened state, that contains silver halide crystals, that has an original transmittance between 60 and 75%, a darkened transmittance less than 30% at 25° C. and less than 40% at 40° C., and $F_5$ transmittance that is at least 25% greater than the darkened value and that is greater than 50%, that has a dominant wavelength in the range of 575 to 585 nm, that has a soda content greater than 1% in at least a surface layer, or that contains as additives 1–6 ppm palladium or a combination of 2–10 ppm Au and up to 0.9% $Er_2O_3$.

PRIOR ART

Figure 1:
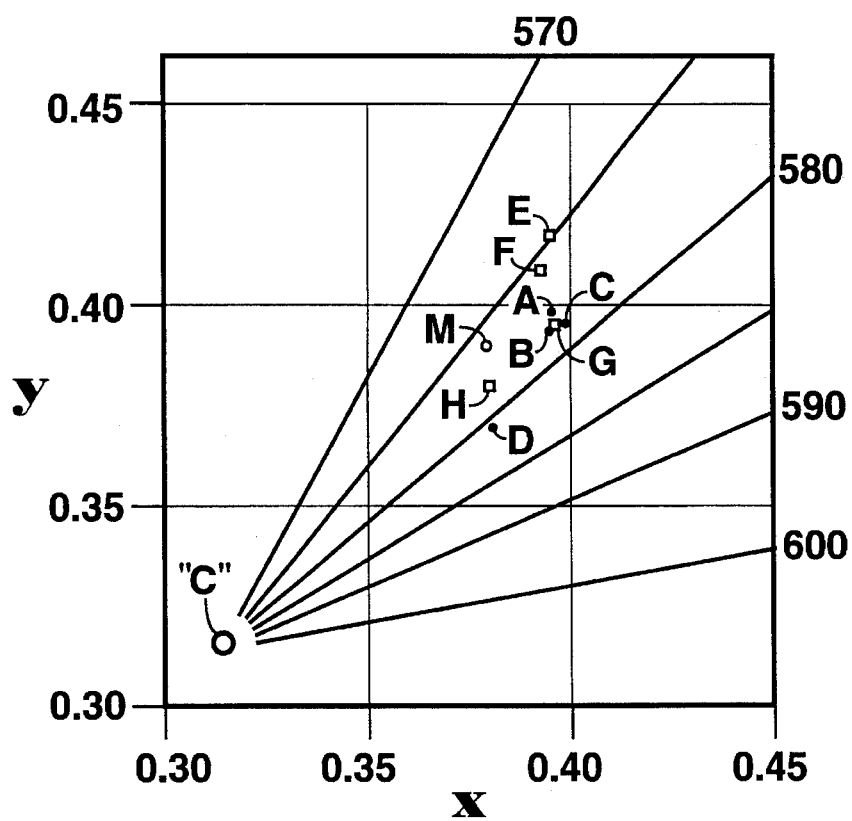
FIG. 1 is a color mixture diagram illustrating chromaticity values for four examples of the invention.

In addition to the an mentioned in the Background section, items of possible interest are set forth in a separate paper.

DESCRIPTION OF THE INVENTION

The invention is based on our discovery that certain photochromic glasses containing silver halide crystals can be treated in a reducing atmosphere to impart a pleasing amber appearance, both in the faded and darkened states. Further, we have found that these glasses can be chemically strengthened, and that any change in the dominant wavelength during such treatment is in a desirable direction. In particular, we have found that photochromic glasses described in U.S. Pat. Nos. 4,608,349 (Kerko et al.), 5,244,845 (Kerko et al.) and 5,300,465 (Grateau et al.) can be thermally treated in a reducing atmosphere, preferably hydrogen, to produce the desired amber color effects.

The −349 glasses have compositions, in calculated weight percent, consisting essentially of:

| SiO$_2$ | 54–58 | Ag | 0.20–0.33 |
|---|---|---|---|
| B$_2$O$_3$ | 18–22 | Cl | 0.30–0.50 |
| Al$_2$O$_3$ | 7–8 | Br | 0.04–0.12 |
| Li$_2$O | 3.75–4.5 | CuO | 0.007–0.012 |
| Na$_2$O | 0–1 | PbO | 0–0.08 |
| K$_2$O | 5.5–7.5 | Sb$_2$O$_3$ | 0–0.20 |
| TiO$_2$ | 0–2 | ZrO$_2$ | 2–4.5 |

The glasses disclosed in the −845 patent have the same base glass compositions as those disclosed in the −349 patent. They differ in that a content of 1–6 ppm Pd, and optionally 0–10% Er$_2$O$_3$ and/or 0–10 ppm Au are present as colorant additives. These additives impart a brown color to the glass in the darkened state. The −845 glasses also have slightly lower Ag and Cl contents, 0.18–0.33% and 0.25–0.50% respectively.

The −465 glasses, expressed in weight percent, consist essentially of:

| SiO$_2$ | 52–58 | Ag | 0.15–0.25 |
|---|---|---|---|
| B$_2$O$_3$ | 16–21 | Cl | 0.25–0.40 |
| Al$_2$O$_3$ | 6–9 | Br | 0.06–0.13 |
| ZrO$_2$ | 1.5–2.8 | CuO | 0.003–0.007 |
| Li$_2$O | 2–3.5 | Au | 2–10 ppm |
| Na$_2$O | 0–2.5 | Er$_2$O$_3$ | up to 0.9% |
| K$_2$O | 4–8 | | |
| CaO | 2–3.5 | | |
| TiO$_2$ | 1.2–2.5 | | |

Commercial glasses having compositions falling within each of the three indicated patents were melted and lens blanks molded from the melts and lenses prepared. The glass compositions in approximate weight percent were as follows:

TABLE I

| | A | B | C | D |
|---|---|---|---|---|
| SiO$_2$ | 55.2 | 55.2 | 54.5 | 55.2 |
| B$_2$O$_3$ | 20.6 | 20.6 | 20.2 | 20.6 |
| Al$_2$O$_3$ | 7.4 | 7.4 | 8.6 | 7.4 |
| K$_2$O | 6.1 | 6.1 | 4.9 | 6.1 |
| Na$_2$O | 0.8 | 0.8 | 1.5 | 0.8 |
| Li$_2$O | 4.3 | 4.3 | 2.8 | 4.3 |
| ZrO$_2$ | 4.0 | 4.0 | 2.6 | 4.0 |
| TiO$_2$ | 1.4 | 1.4 | 2.0 | 1.4 |
| PbO | 0.05 | 0.03 | | 0.05 |
| Ag | 0.17 | 0.25 | 0.22 | 0.29 |
| Cl | 0.36 | 0.36 | 0.38 | 0.36 |
| Br | 0.12 | 0.12 | 0.09 | 0.12 |
| CuO | 0.008 | 0.008 | 0.004 | 0.006 |
| Sb$_2$O$_3$ | 0.004 | 0.004 | | 0.04 |
| Er$_2$O$_3$ | 0.25 | 0.25 | 0.8 | |
| Pd | 4 ppm | 4 ppm | | |
| CaO | | | 2.9 | |
| Au | | | 5 ppm | |

The lens formed from glass A had a thickness of 1.5 mm; the lenses from glasses B, C and D were 2 mm thick. Each of the lenses was fired in pure, flowing hydrogen at about 400° C. for 30 minutes. Transmittance measurements were made on the lenses, after which they were exposed to a standard chemical tempering treatment. This treatment involved immersion for 16 hours at 395° C. in a molten salt bath composed of 60% KNO$_3$ and 40% NaNO$_3$. Further measurements were then made on the lenses in both the faded and darkened states.

Certain of the measured data are plotted in FIG. 1, a color mixture diagram illustrating chromaticity values. In the diagram, x coordinates are plotted on the horizontal axis and y coordinates on the vertical axis. Dominant wavelengths in nm are plotted in the fan-shaped lines extending from the Illuminant C. The values for faded, chemical tempered lenses are designated by capital letters A, B, C and D corresponding to the glass compositions. For comparison, corresponding values were measured on the samples before chemical tempering, and are shown by letters E, F, G and H. Also, the values for an early photochromic glass, corresponding in composition to the Simms glass, are included and designated as M. The glass was fired to produce a fairly good amber tint, as shown, but faded quite slowly.

It will be noted that chemical tempering of the present glasses moves the chromaticity coordinates in the direction of a higher dominant wavelength. This causes the glass to have a more reddish cast in the faded and darkened states. This contrasts to the greenish or yellow cast observed in previous amber sunglasses in the darkened state.

Two sets of polished samples were prepared in 2 mm thickness from ophthalmic lens blanks. The blanks were molded from a commercial glass, D.

Both sets of samples were fired in 100% hydrogen for 30 minutes at a temperature of 400° C. One set was fired as received, that is, annealed and polished, but not otherwise treated. The other set was immersed in a molten sodium ion exchange bath (NaNO$_3$) for one hour at 400° C. This treatment provided a surface layer of enhanced sodium ion content on the glass sample, and correspondingly diminished content of other alkali metal ions, primarily lithium.

Figure 2:
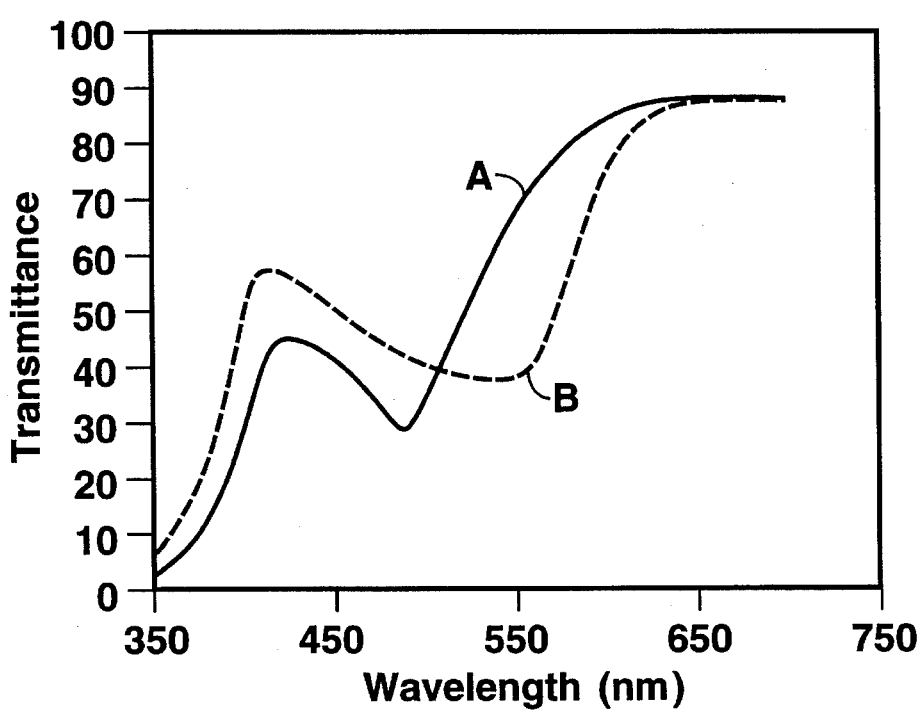
FIG. 2 is a graphical representation comparing transmittance values before and after a sodium ion exchange treatment in accordance with the invention.

Spectral transmittance values were measured on both samples in the undarkened state. The values thus obtained were plotted to provide transmittance curves as shown in FIG. 2, a graphical representation in which wavelength in nm is plotted along the horizontal axis and percent transmittance is plotted along the vertical axis. Curve A in FIG. 2 is the transmittance curve for the sample as received, that is, untreated. Curve B represents the soda-exchanged sample. These curves demonstrate the need for an adequate sodium ion concentration in at least that part of the lens which is colored during the hydrogen firing to move the dominant wavelength to longer wavelengths, that is, toward a darker, reddish brown color. It may be noted that a similar effect was observed when the samples were darkened, that is, the soda-exchanged glass had a more reddish brown color.

The amount and nature of the color of the hydrogen fired glass depend on the glass composition, the firing temperature and the firing time. Control of firing time and temperature are necessary in order to produce uniformity of color from piece to piece.

A short firing time employing pure hydrogen is desirable. However, color control in a large furnace for volume production may be difficult. In that event, better color control can result if a lens is fired at a selected temperature for a longer time in hydrogen gas diluted with nitrogen gas. This procedure can produce the same light absorption as that obtained by firing for a shorter time in pure hydrogen at the same temperature.

A 1.9 mm thick sample was prepared for testing of photochromic properties. The sample was prepared from the glass of example B above, and was fired in pure hydrogen for 30 minutes at 400° C. The original luminous transmittance of the fired glass (T$_0$) was 69.9%. After fully darkening of the sample, the transmittance was measured as 21.6%.

After a five minute fading period, the measured transmittance ($T_5$) was 51.2%. This indicated a difference in fading of 29.6%.

A series of clear lenses, polished to a normal thickness of 2 mm, was fired in 100% flowing hydrogen. The lenses were fired in pairs for 30 minutes, but at temperatures ranging from 360° to 460° C. in 20° C. intervals. One member of each pair was annealed only, while the other member was chemically tempered after annealing. The tempering involved immersion in a mixed ($NANO_3$–$KNO_3$) molten salt bath for 16 hours at 400° C.

Visual examination revealed that the lenses darkened through a series of amber tints. The chemically tempered lenses were darker. The hydrogen treatment at 400° C. was considered most desirable and adopted as a preferred practice.

Three pairs of lenses were prepared for testing. One member of each pair was the palladium—containing glass A; the other member was glass B, a slightly modified version of glass D. The pairs were each fired in hydrogen at about 400° C. for 30 minutes.

The glass A lenses exhibited faded transmittances of about 70%, while the faded transmittances of the glass B lenses were about 73%. The lenses presented a pleasing brownish amber in both the faded and darkened states. They also exhibited a shift toward the red, that is, toward a longer dominant wavelength, when chemically tempered. The color purity of the glass A lenses was about 10% greater than that of the glass B lenses. This result is attributed to the difference in silver contents.

The superior photochromic performance of the present amber sunglass lenses is seen from a comparison with samples of previous lenses used for that purpose. The comparison lenses were molded from Codes 8111 and 8132 glasses mentioned earlier. The present lens had the composition of Example A in TABLE I.

TABLE II identifies the lens thickness in mm and the initial luminous transmittance (To) in percent. Each lens was allowed to darken at each of four different temperatures. Each lens was held at each temperature for 15 minutes to darken. Transmittance values were measured on each lens after each darkening. The measured values are recorded in TABLE II in percent. The temperatures are representative of expected use conditions. All darkening and measurements were performed in identical manner using a solar simulator system.

TABLE II

| Glass | Thknes | $t_o$ | 0° C. | 13° C. | 25° C. | 40° C. |
|---|---|---|---|---|---|---|
| 8111 | 2.00 mm | 73.5 | 17.6 | 18.2 | 21.0 | 31.2 |
| 8132 | 2.25 mm | 74.0 | 11.7 | 15.9 | 25.1 | 42.6 |
| A | 1.48 mm | 70.9 | 11.6 | 14.1 | 21.0 | 37.9 |

It will be observed that the Code 8111 version has a ~30% greater lens weight as well as the greenish problem. The Code 8132 version does not get as dark at higher temperatures, even with 50% greater glass thickness.

We claim:

1. A photochromic glass having an amber color in both the darkened and faded states and having an original transmittance of 60–75%, a darkened transmittance that is less than 30% at 25° C. and less than 40% at 40° C., a faded transmittance equal to the darkened transmittance plus at least 25% and a value of at least 50%, a dominant wavelength between 575 and 585 nm, the glass containing silver halide crystals, having a $Na_2O$ content of at least 1% in at least a surface layer, or containing as additives 1–6 ppm Pd, or a combination of 2–10 ppm Au and up to 0.9% $Er_2O_3$ and being surface-reduced by thermally treating in a reducing atmosphere.

2. A photochromic glass in accordance with claim 1 wherein the original transmittance is in the range of 68–75%.

3. A photochromic glass in accordance with claim 1 having a darkened transmittance of not over 25% at 25° C.

4. A photochromic glass in accordance with claim 1 that is chemically strengthened and wherein the position in a color mixture diagram is raised to a higher dominant wavelength.

5. A photochromic glass in accordance with claim 1 having a content of 1–6 ppm Pd.

6. A photochromic glass in accordance with claim 1 containing 2–10 ppm Au and up to 0.9% $Er_2O_3$.

7. A photochromic glass in accordance with claim 1 having a surface layer with an enhanced sodium ion content and a corresponding diminished lithium ion content whereby an $Na_2O$ content of at least 1% is provided in the surface layer.

8. A photochromic glass in accordance with claim 1 having a composition, calculated in percent by weight, that consists essentially of:

| | | | |
|---|---|---|---|
| $SiO_2$ | 52–58 | Ag | 0.15–0.33 |
| $B_2O_3$ | 16–22 | Cl | 0.25–0.50 |
| $Al_2O_3$ | 6–9 | Br | 0.04–0.13 |
| $ZrO_2$ | 1.5–4.5 | CuO | 0.003–0.012 |
| $TiO_2$ | 0–2.5 | $Sb_2O_3$ | 0–0.20 |
| $Li_2O$ | 2–4.5 | Au | 0–10 ppm |
| $Na_2O$ | 0–2.5 | $Er_2O_3$ | 0–0.9 |
| $K_2O$ | 4–8 | Pd | 0–6 ppm. |
| CaO | 0–3.5 | | |

9. A photochromic glass in accordance with claim 7 having a composition, calculated in percent by weight that consists essentially of:

| | | | |
|---|---|---|---|
| $SiO_2$ | 54–58 | Ag | 0.18–0.33 |
| $B_2O_3$ | 18–22 | Cl | 0.25–0.50 |
| $Al_2O_3$ | 7–8 | Br | 0.04–0.12 |
| $Li_2O$ | 3.75–4.5 | CuO | 0.007–0.012 |
| $Na_2O$ | 0–1 | PbO | 0–0.08 |
| $K_2O$ | 5.5–7.5 | $Sb_2O_3$ | 0–0.20. |
| $TiO_2$ | 0–2 | | |
| $ZrO_2$ | 2–4.5 | | |

10. A photochromic glass in accordance with claim 7 having a composition, expressed in weight percent, that consists essentially of:

| | | | |
|---|---|---|---|
| $SiO_2$ | 52–58 | Ag | 0.15–0.25 |
| $B_2O_3$ | 16–21 | Cl | 0.25–0.40 |
| $Al_2O_3$ | 6–9 | Br | 0.06–0.13 |
| $ZrO_2$ | 1.5–2.8 | CuO | 0.003–0.007 |
| $Li_2O$ | 2–3.5 | Au | 2–10 ppm |
| $Na_2O$ | 0–2.5 | $Er_2O_3$ | up to 0.9%. |
| $K_2O$ | 4–8 | | |
| $TiO_2$ | 1.2–2.5 | | |
| CaO | 2–3.5 | | |

* * * * *